United States Patent [19]

Berkers

[11] Patent Number: 4,856,870

[45] Date of Patent: Aug. 15, 1989

[54] LASER MODULE

[75] Inventor: Jacobus A. P. Berkers, Helden, Netherlands

[73] Assignee: Oce-Nederland B.V., Venlo, Netherlands

[21] Appl. No.: 173,881

[22] Filed: Mar. 28, 1988

[30] Foreign Application Priority Data

Apr. 9, 1987 [NL] Netherlands ............... 8700836

[51] Int. Cl.⁴ .............................................. G02B 7/02
[52] U.S. Cl. ................................... 350/252; 350/255; 346/108
[58] Field of Search ............... 350/252, 245, 255, 257; 346/108, 160

[56] References Cited

U.S. PATENT DOCUMENTS

| | | | |
|---|---|---|---|
| 2,532,300 | 12/1950 | Harvey | 350/255 |
| 3,915,557 | 10/1975 | Shimojima | 350/255 |
| 4,297,713 | 10/1981 | Ichikawa | 346/108 |
| 4,431,267 | 2/1984 | Finck et al. | 350/252 |

Primary Examiner—Bruce Y. Arnold
Assistant Examiner—Loha Ben
Attorney, Agent, or Firm—Reed Smith Shaw & McClay

[57] ABSTRACT

An improved laser module is disclosed wherein a solid state laser is mounted on a laser holder and a lens system is mounted in a lens holder. The lens holder is movable with respect to the laser holder and is provided with a cylindrical part having a first screwthread. To achieve precise focussing of the laser, the laser holder is provided with a cylindrical recess wherein a second screwthread is provided. A cam and groove assembly is also provided in the lens holder and laser holder to prevent rotation of the lens holder. A rotatable intermediate ring is disposed between the first and second screwthreads when viewed radially. This rotatable intermediate ring is provided with an internal screwthread in engagement with the first screwthread and with an external screwthread in engagement with the second screwthread. The pitch of the internal screwthread is slightly different from the pitch of the external screwthread which enables the lens holder to be adjusted more precisely.

11 Claims, 2 Drawing Sheets

LASER MODULE

FIELD OF THE INVENTION

The present invention relates to a laser module for a laser recording device such as a laser printer. More particularly, the present invention relates to a laser module which can be accurately focussed more easily.

BACKGROUND OF THE INVENTION

U.S. Pat. No. 4,297,713 discloses a laser printer having an integral combination of a laser module and an optical system to convert the laser beam of a solid state laser into a collimated beam. The beam is focussed on a photosensitive medium and deflected linewise thereover via a polygonal mirror and a scanning lens. The polygonal mirror and the scanning lens are mounted in a sealed module holder. The lens holder is provided with fit surfaces corresponding to fit surfaces on the module holder. By means of these fit surfaces, the lens holder is mounted and secured in a fixed position against the module holder. The laser holder is mounted against the lens holder via special ball and groove connections. A collimator lens system is mounted in the lens holder. To enable this lens system to be moved with respect to the laser so as to obtain the smallest possible spot on the photosensitive layer, the lens holder has a screwthread. A nut provided with a cylindrical hole is mounted on this screwthread. The lens system is pressed against the nut by a spring and the distance between the lens system and the laser can be varied by turning the nut.

A lens system of the laser module described above has a very small depth of focus, typically about 2-3 $\mu$m so that the distance between the lens system and the laser must be set with an accuracy of about 1 $\mu$m. To achieve this accuracy, the screwthread must have the smallest pitch possible which in practice, means that the pitch will be about 0.35 mm. It is virtually impossible to obtain practicably a very much finer screwthread.

Another disadvantage of this laser module is that an extremely small angular displacement of the nut (of about 1°) is all that is required to cause a lens displacement of 1 $\mu$m. Because of this, there is a need to lock this nut by a second nut to prevent accidental displacement. However, the locking action of the second nut often results in a small angular displacement taking place so that there is a deviation from the previously set distance.

Other similar systems of adjusting a lens system for a laser are shown and described in United Kingdom Pat. No. 345,102 and the article entitled "Passively mode-locked ND:glass laser oscillator optimized for TEM$_{OO}$ selectivity and long term stability and reliability," in the *Review of Scientific Instruments*, Vol. 52, No. 6 (June 1981) at pp. 852-57. It would be desirable, therefore, to provide a laser module having a lens system which did not have the above-described disadvantages.

SUMMARY OF THE INVENTION

The present invention relates to a laser module comprising a laser holder upon which a solid state laser is mounted; a lens holder in which a lens system is mounted that receives the light emitted by the laser, the lens holder being moveable with respect to the laser holder, and being provided with a cylindrical part having a first screwthread; the laser holder being provided with a first cylindrical recess having a second screwthread, and a means for preventing rotation of the lens holder; and a rotatable intermediate ring which is disposed between the two screwthreads when viewed radially and is provided with an internal screwthread in engagement with the first screwthread and with an external screwthread in engagement with the second screwthread, the pitch of the internal screwthread being different from the pitch of the external screwthread.

As a result of this configuration, a 360° rotation of the rotatable intermediate ring results in a displacement of the lens holder which corresponds to the difference between the pitches of the internal screwthread and the external screwthread. If an intermediate ring is used with an internal screwthread having a pitch of 0.45 mm and an external screwthread having a pitch of 0.50 mm, a lens movement of 1 $\mu$m will correspond to an angular displacement of about 7° of the intermediate ring. Thus, the lens adjustment can be made extremely accurate.

Other details, objects and advantages of the present invention will become more readily apparent from the following description and accompanying drawings of a presently preferred embodiment thereof.

BRIEF DESCRIPTION OF THE DRAWINGS

In the accompanying drawings, a preferred embodiment of the present invention is illustrated, by way of example only, wherein.

DESCRIPTION OF THE PREFERRED EMBODIMENT

Figure 1:
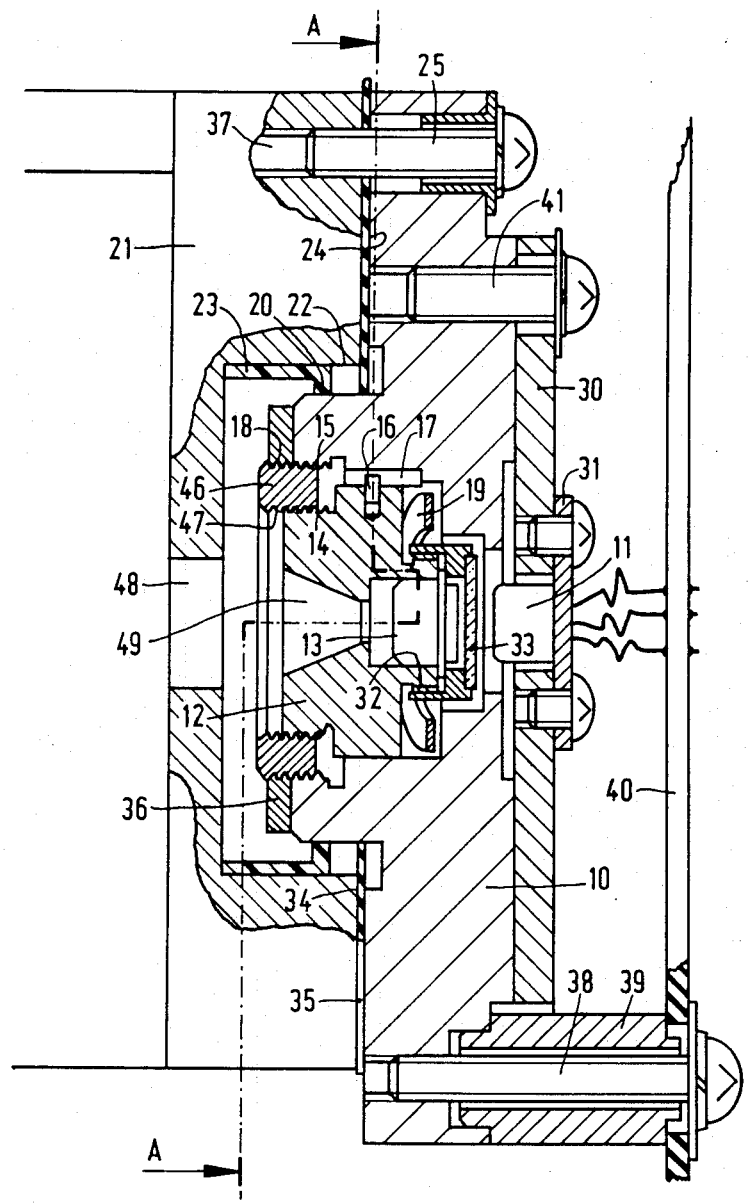
FIG. 1 is a cross-section through the laser module according to the present invention.
Figure 2:
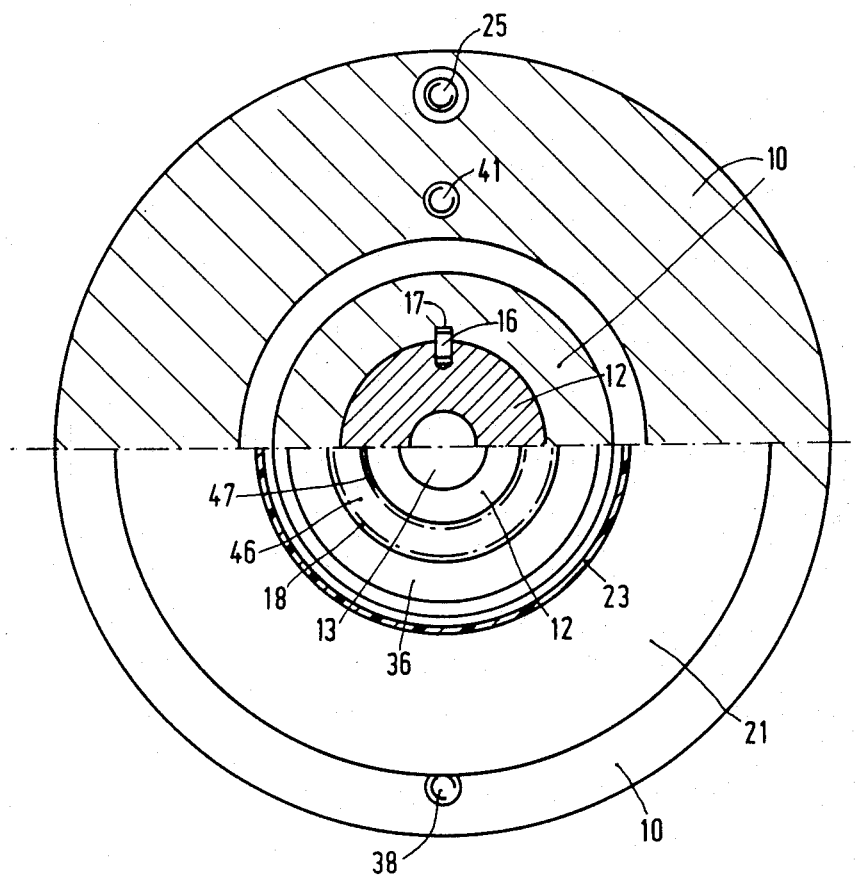
FIG. 2 is a combined section through the laser module taken along line AA of FIG. 1.

The laser module preferably comprises a laser holder 10, a lens holder 12, a module holder 21 and a Printed circuit board 40 containing the control electronics for the solid state laser 11. Module holder 21 is provided with a cylindrical recess 22, an opening 48 to pass the laser light to a polygonal mirror and a scanning lens (not shown), usually an f-$\theta$ lens, to illuminate each time a line spotwise on a moving photosensitive drum or belt. Module holder 21 has a circular abutment surface 34 extending around cylindrical recess 22. Module holder 21 also contains a number of screw holes 37.

Laser holder 10 contains a cylindrical part, the outside of which has a cylindrical fit surface 20. In order to center laser holder 10 in cylindrical recess 22 of module holder 21, a strong plastic ring 23 is disposed between the two parts. A circular fit surface 24 is provided on laser holder 10 which can be fitted accurately against abutment surface 34 of module holder 21. Laser holder 10 is secured firmly and with accurate positioning to module holder 21 by means of bolts 25 secured in screw holes 37. A thin ring 35 of silicone rubber is mounted between fit surface 34 and abutment surface 24 as electrical insulation.

Laser holder 10 is provided with a plate 30 on which base plate 31 of solid state laser 11 is secured by means of a number of bolts. Plate 30 has fixing holes of a size such that plate 30 and hence laser 11 mounted thereon can be displaced slightly in every direction. Plate 30 is secured to laser holder 10 in the correct position by bolts 41. Laser holder 10 also has a cylindrical recess in which lens holder 12 fits exactly. Lens holder 12 is provided with a cam 16 which fits accurately in groove 17 which is provided in laser holder 10 and extends axially therein. In this way, lens holder 12 is restrained and can only move axially. Rotation of lens holder 12 in laser holder 10 is not possible.

Lens system 13 is secured in lens holder 12 by means of a screw cap 32 provided with an opening in which a small glass plate 33 is disposed. Lens system 13 is a collimator system used to convert the divergent laser beam into a substantially parallel beam which is fed to the polygon mirror via a conical hole 49.

Lens holder 12 has a first screwthread 14 on the outside of the cylindrical part, preferably with a pitch of 0.45 mm. Laser holder 10 is provided with a second screwthread 15 on the inside of the cylindrical recess, preferably having a pitch of 0.50 mm. An intermediate ring 46 having an external screwthread 18 with a pitch of 0.50 mm and an internal screwthread 47 with a pitch of 0.45 mm is mounted between the first and second screwthreads 14, 15. Screwthread 18 of intermediate ring 46 is in engagement with the second screwthread 15 on laser holder 10 while screwthread 47 of intermediate ring 46 is in engagement with the first screwthread 14 on lens holder 12.

A compression spring 19 is mounted between lens holder 12 and laser holder 10 and presses lens holder 12 axially against screwthreads 47 and 18 in order to eliminate play in the screwthreads. Intermediate ring 46 can be secured by a locking ring 36, the inside of which has a screwthread with a pitch of 0.50 mm. Printed circuit board 40 containing the control electronics for solid state laser 11 is secured to laser holder 10 by means of a spacer bushing 39 and bolt 38.

Optical adjustment is effected outside the laser printer in a special test rig. Like module holder 21 the test rig also has a cylindrical recess and an abutment surface. Laser holder 10 with lens holder 12, intermediate ring 46 and a locking ring 36 is mounted in the test rig. At certain intervals, the test rig has sensors to measure the location and size of the laser beam. First, solid state laser 11 is secured accurately on the optical axis by means of screws. Intermediate ring 46 is then turned to set the exact focussing. A 360° revolution moves the intermediate ring through a distance of 0.50 mm towards laser 11. Since lens holder 12 cannot rotate, it moves 0.45 mm away from laser 11 on one revolution of intermediate ring 46. The resultant of the two movements is that lens holder 12 moves towards laser 11 by the amount 0.50−0.45=0.05 mm. When lens system 13 is accurately adjusted, intermediate ring 46 is secured by locking ring 36.

Since the depth of focus of lens system 13 is typically only 2–3 μm and the working temperature range of the laser is between 10° C. and 50° C., the adjustment procedure is performed at a mean temperature (i.e., 30° C.). In this way, any deviation of the focussing at different temperatures will be minimized.

The laser module, now having the optimum adjustment, is then removed from the test rig and can be accurately fitted in a laser holder of a laser printer via the fit surface and the cylindrical fit surface. This solid and simple construction guarantees a high degree of reproducibility.

The invention is not restricted to the embodiment described herein. For example, intermediate ring 46 may have any desired difference in pitch between the screwthreads but for the most accurate adjustment, the difference in pitches between the screwthreads should not exceed 0.2 mm. Similarly, intermediate ring 46 can be locked in many other ways than a locking ring, such as by means of a locking screw which is screwed onto the outer screwthread of the ring via laser holder 10. The means for preventing rotation of the lens holder 12 can also be constructed in many different ways than just cam 16 and groove 17. For example, lens holder 12 may have a flat surface or, more generally, lens holder 12 need not be rotationally symmetrical.

While a presently preferred embodiment of practicing the invention has been shown and described with particularity in connection with the accompanying drawings, the invention may otherwise be embodied within the scope of the following claims.

What is claimed is:

1. A laser module comprising: a laser holder and a solid state laser mounted thereon; a lens system mounted in a lens holder for receiving light emitted by the laser, the lens holder being movable with respect to the laser holder and being provided with a cylindrical part having a first screwthread; the laser holder being provided with a first cylindrical recess having a second screwthread, and a means for preventing rotation of the lens holder; and a rotatable intermediate ring which is disposed between the two screwthreads and is provided with an internal screwthread in engagement with the first screwthread and an external screwthread in engagement with the second screwthread, the pitch of the internal screwthread being different from and less than the pitch of the external screwthread.

2. A laser module as described in claim 1 wherein the difference in the pitches of the internal screwthread and the external screwthread on the rotatable intermediate ring is at most 0.2 mm.

3. A laser module as described in claim 2 wherein the difference is pitches of the internal screwthread and the external screwthread on the rotatable intermediate ring is 0.05 mm.

4. A laser module as described in claim 1 further comprising a means for pressing the lens holder axially against the intermediate ring.

5. A laser module as described in claim 4 wherein the means for pressing comprises a compression spring disposed between the laser holder and the lens holder.

6. A laser module as described in claim 4 wherein the laser holder is provided with a cylindrical fit surface to center the laser holder in a second cylindrical recess in a module holder.

7. A laser module as described in claim 6, wherein a plastic fit ring is disposed between the cylindrical fit surface and the second cylindrical recess.

8. A laser module as described in claim 7 wherein the laser holder has an abutment surface and a means for attaching the laser holder to the module holder.

9. A laser module as described in claim 1 wherein the laser holder is provided with a cylindrical fit surface to center the laser holder in a second cylindrical recess in a module holder.

10. A laser module as described in claim 9, wherein a plastic fit ring is disposed between the cylindrical fit surface and the second cylindrical recess.

11. A laser module as described in claim 10 wherein the laser holder has an abutment surface and a means for attaching the laser holder to the module holder.

* * * * *